(12) United States Patent
Frugier-Dorrington et al.

(10) Patent No.: US 11,797,605 B2
(45) Date of Patent: Oct. 24, 2023

(54) APPLYING GEOTAGS TO IMAGES FOR IDENTIFYING EXPLORATION OPPORTUNITIES

(71) Applicant: Schlumberger Technology Corporation, Sugar Land, TX (US)

(72) Inventors: Tracy Frugier-Dorrington, Houston, TX (US); Carlos Garcia, Jr., Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/596,141

(22) PCT Filed: Jun. 4, 2020

(86) PCT No.: PCT/US2020/036051
§ 371 (c)(1),
(2) Date: Dec. 3, 2021

(87) PCT Pub. No.: WO2020/247580
PCT Pub. Date: Dec. 10, 2020

(65) Prior Publication Data
US 2022/0300552 A1 Sep. 22, 2022

Related U.S. Application Data

(60) Provisional application No. 62/856,793, filed on Jun. 4, 2019.

(51) Int. Cl.
*G06F 16/58* (2019.01)
*G06F 16/51* (2019.01)
*G06F 16/55* (2019.01)

(52) U.S. Cl.
CPC .......... *G06F 16/5866* (2019.01); *G06F 16/51* (2019.01); *G06F 16/55* (2019.01)

(58) Field of Classification Search
CPC ....... G06F 16/5866; G06F 16/51; G06F 16/55
(Continued)

(56) References Cited

U.S. PATENT DOCUMENTS 9,104,695 B1 * 8/2015 Cervelli .................. G06F 16/29
10,123,157 B2 * 11/2018 Appleby .................. G01V 1/30
(Continued)

FOREIGN PATENT DOCUMENTS

CA    2877373 A1 *  1/2014  .......... E21B 47/022
CA    2832188 A1 *  5/2014  .......... G06Q 10/0833
(Continued)

OTHER PUBLICATIONS

Verstockt et al., "Geolocalization of Crowdsourced Images for 3-D Modeling of City Points of Interest", IEEE GeoScience and Remote Sensing Letters, vol. 12, No. 8, Aug. 2015, pp. 1670-1672. (Year: 2015).*

(Continued)

*Primary Examiner* — Phuong Thao Cao
(74) *Attorney, Agent, or Firm* — Jeffrey D. Frantz

(57) ABSTRACT

A method includes obtaining first data representing a subterranean domain, and creating a geotag associated with a three-dimensional location of interest in the subterranean domain and a feature at the location of interest. The geotag is further associated with second data that describes the location of interest in the subterranean domain. The method also includes generating metadata describing a portion of the first data, the second data, or both, storing the geotag in a database including a plurality of geotags. The method may also include searching for an analog to the geotag.

20 Claims, 12 Drawing Sheets

(58) Field of Classification Search
USPC .......................................................... 707/740
See application file for complete search history.

(56) References Cited

U.S. PATENT DOCUMENTS

| | | | |
|---|---|---|---|
| 2005/0206562 A1* | 9/2005 | Willson .................. | G01V 15/00 340/988 |
| 2009/0229819 A1 | 9/2009 | Repin et al. | |
| 2010/0268470 A1 | 10/2010 | Kamal et al. | |
| 2011/0264430 A1 | 10/2011 | Tapscott et al. | |
| 2012/0084000 A1* | 4/2012 | Wang .................. | G01C 21/3484 701/426 |
| 2012/0296643 A1 | 11/2012 | Kristjansson et al. | |
| 2013/0091452 A1* | 4/2013 | Sorden .................... | G06F 30/20 715/771 |
| 2014/0003501 A1* | 1/2014 | Soroushian ............ | G06F 16/73 375/E7.243 |
| 2014/0025413 A1* | 1/2014 | Yeager ................ | G06Q 10/0631 705/7.11 |
| 2014/0379317 A1* | 12/2014 | Sanden ................ | G01V 99/005 703/10 |
| 2015/0084993 A1 | 3/2015 | Engelkemeir | |
| 2015/0248439 A1 | 9/2015 | Ratnakar | |
| 2016/0187508 A1 | 6/2016 | Plost et al. | |
| 2017/0067325 A1* | 3/2017 | Garcia Zurita ......... | E21B 43/00 |
| 2017/0186104 A1* | 6/2017 | Siddiqui ................ | G06Q 50/02 |
| 2017/0293673 A1* | 10/2017 | Purumala ............ | G06F 3/04855 |
| 2018/0144558 A1* | 5/2018 | Priest .................. | G06F 16/9537 |
| 2018/0300341 A1 | 10/2018 | Hadar et al. | |
| 2019/0348180 A1* | 11/2019 | Sharifi Sedeh ........ | G16H 50/70 |
| 2020/0027229 A1* | 1/2020 | Shen .................... | G06V 10/809 |
| 2020/0145789 A1* | 5/2020 | Tullman .................. | G01V 3/16 |

FOREIGN PATENT DOCUMENTS

| | | | | |
|---|---|---|---|---|
| CN | 102396004 A * | 3/2012 | ............ | G06T 17/05 |
| KR | 10-2017-0090706 A | 8/2017 | | |
| WO | 2010102097 A1 | 9/2010 | | |
| WO | WO-2012172160 A1 * | 12/2012 | ........ | G06F 17/30241 |
| WO | WO-2019098430 A1 * | 5/2019 | ............... | G06N 3/08 |
| WO | WO-2020142673 A1 * | 7/2020 | ............ | E21B 33/03 |
| WO | 2022019918 A1 | 1/2022 | | |

OTHER PUBLICATIONS

International Search Report and Written Opinion for the Equivalent PCT/US2020/036051 dated Sep. 11, 2020 (11 Pages).

International Preliminary Report on Patentability of International Patent Application No. PCT/US2020/036051 dated Dec. 16, 2021, 8 pages.

Schellart, W. P. 2002. Analogue modelling of large-scale tectonic processes: an introduction. In: Schellart , W. P. and Passchier, C. 2002. Analogue modelling of largescale tectonic processes. Journal of the Virtual Explorer, 7, 1-6.

Dooley, T.P. & Schreurs, G. 2012. Analogue modelling of intraplate strike-slip tectonics: A review and new experimental results, Tectonophysics 574-575, 1-71.

Grammer, G. M., P. M. Harris, and G. P. Eberli, 2004, Integration of outcrop and modern analogs in reservoir modeling: Overview with examples from the Bahamas, in: Integration of outcrop and modern analogs in reservoir modeling, AAPG Memoir 80, p. 1-22.

Search Report and Written Opinion of International Patent Application No. PCT/US2020/043423 dated Sep. 10, 2020; 11 pages.

International Preliminary Report on Patentability of International Patent Application No. PCT/US2020/043423 dated Feb. 2, 2023; 8 pages.

Howell, J.A., Martinius, A.W. & Good T.R. 2014, The application of outcrop analogues in geological modelling: a review, present status and future outlook, in : Martinius, A. W., Howell, J. A. & Good, T. R. (eds) 2014. Sediment-Body Geometry and Heterogeneity: Analogue Studies for Modelling the Subsurface. Geological Society, London, Special Publications, 387, 1-25.

Hood, K. C., et al., 2000, "Use of Geographic Information Systems in Hydrocarbon Resource Assessment and Opportunity Analysis." Geographic information systems in petroleum exploration and development: AAPG, Computer Applications in Geology, No. 4, p. 173-185.

Wikipedia, "Hydrocarbon exploration", Jun. 11, 2020, Retrieved from the Internet on Sep. 2, 2020, <URL:<https://en.wikipedia.org/w/index.php?title=Hydrocarbon_exploration&oldid=961990342>; 6 pages.

Extended European Search Report issued in European Patent Application No. 20819177.5 dated Apr. 14, 2023; 7 pages.

* cited by examiner

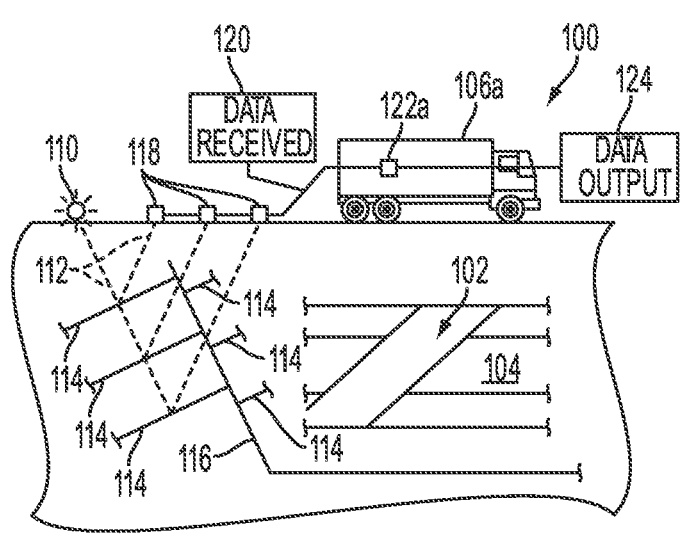
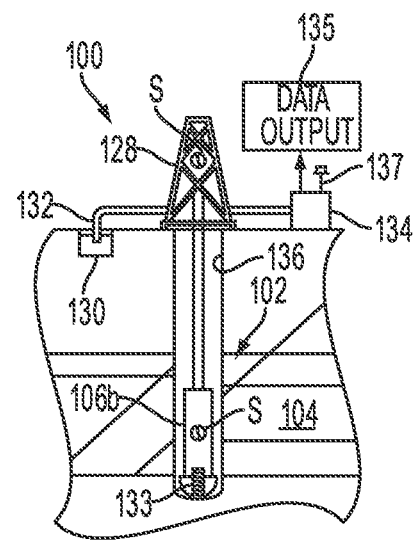
FIG. 1A
FIG. 1B
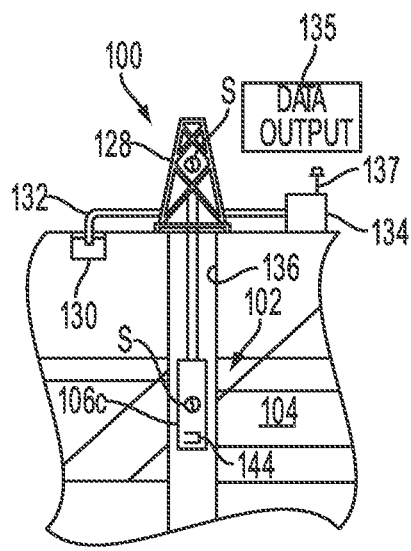
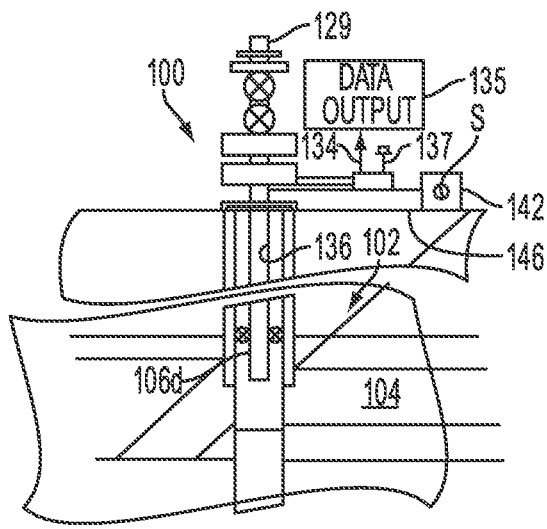
FIG. 1C
FIG. 1D

APPLYING GEOTAGS TO IMAGES FOR IDENTIFYING EXPLORATION OPPORTUNITIES

CROSS-REFERENCE TO RELATED APPLICATIONS

This application claims priority to U.S. Provisional Patent Application having Ser. No. 62/856,793, which was filed on Jun. 4, 2019, and is incorporated herein by reference in its entirety.

BACKGROUND

In oil and gas exploration, explorers make use of analogues (e.g., wells drilled in similar environments and/or under similar conditions) to find new areas of exploration. In such a process, explorers may refer to databases of geological information about different areas and compare the information to information gathered about a potential area for exploration. However, the datasets can be very large, and users typically may pick horizons within areas to look for geological features, which can make it difficult to capitalize on the large quantities of data that are already available. Moreover, "institutional knowledge", that is, information gleaned by different teams or operators, even within an organization, may be lost or inefficiently used, as it may be stored, if at all, in an ad hoc manner that is not easily accessible to subsequent users.

Recently, map-based systems have been developed to facilitate association with location-based data with the location. Examples include "dropping a pin," such as in a web-based mapping program, e.g., GOOGLE® Maps. Such maps and pin features are useful to a wide-cross section of users, and generally permit ready-access to information about a two-dimensional location (on the surface of the map). This is generally not satisfactory for oilfield data interpretation, however, in which a third spatial dimension, the depth below the surface, may be relevant. Further, the data related to the specific location often changes with time, e.g., in geological time in depositional models, or in real-time as circumstances at or information about a location change, new information is gathered, etc., and thus data represented by static pins at a geographic location may rapidly become obsolete. Finally, such static pins generally do not link together, and thus the existence of the pins is of limited use to one attempting to identify analogous geological conditions and extrapolate likely conditions about another location therefrom.

SUMMARY

Embodiments of the present disclosure provide a method including obtaining first data representing a subterranean domain, and creating a geotag associated with a three-dimensional location of interest in the subterranean domain and a feature at the location of interest. The geotag is further associated with second data that describes the location of interest in the subterranean domain. The method also includes generating metadata describing a portion of the first data, the second data, or both, storing the geotag in a database including a plurality of geotags, and searching for an analog to the geotag. The metadata is also stored in the database, in association with the geotag. Searching for geotags includes accessing the database, identifying one or more analogs to the feature indicated by the geotag based on a comparison of the metadata associated with the geotag to metadata associated with the plurality of geotags or a comparison of the data describing the location of interest with data describing other locations associated with the plurality of geotags, and associating the one or more analogs with the geotag in the database.

Embodiments of the present disclosure provide a computing system including one or more processors, and a memory system comprising one or more non-transitory computer-readable media storing instructions that, when executed by at least one of the one or more processors, cause the computing system to perform operations. The operations include obtaining first data representing a subterranean domain, and creating a geotag associated with a three-dimensional location of interest in the subterranean domain and a feature at the location of interest. The geotag is further associated with second data that describes the location of interest in the subterranean domain. The operations also include generating metadata describing a portion of the first data, the second data, or both, and storing the geotag in a database including a plurality of geotags. The metadata is also stored in the database, in association with the geotag. The operations further include searching for an analog to the geotag. Searching for geotags includes accessing the database, identifying one or more analogs to the feature indicated by the geotag based on a comparison of the metadata associated with the geotag to metadata associated with the plurality of geotags or a comparison of the data describing the location of interest with data describing other locations associated with the plurality of geotags, and associating the one or more analogs with the geotag in the database.

A non-transitory computer-readable media storing instructions that, when executed by at least one processor of a computing system, cause the computing system to perform operations. The operations include obtaining first data representing a subterranean domain, and creating a geotag associated with a three-dimensional location of interest in the subterranean domain and a feature at the location of interest. The geotag is further associated with second data that describes the location of interest in the subterranean domain. The operations also include generating metadata describing the portion of the first data, the second data, or both, and storing the geotag in a database including a plurality of geotags. The metadata is also stored in the database, in association with the geotag. The operations also include searching for an analog to the geotag. Searching for geotags includes accessing the database, identifying one or more analogs to the feature indicated by the geotag based on a comparison of the metadata associated with the geotag to metadata associated with the plurality of geotags or a comparison of the data describing the location of interest with data describing other locations associated with the plurality of geotags, and associating the one or more analogs with the geotag in the database. The second data includes at least one of a seismic image, a well log, a satellite image, gravity data, a map, or an text-based news article, and the second data is dynamic, such that the second data associated with the location of interest and the geotag is also dynamic.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

DESCRIPTION OF EMBODIMENTS

Figure 2:
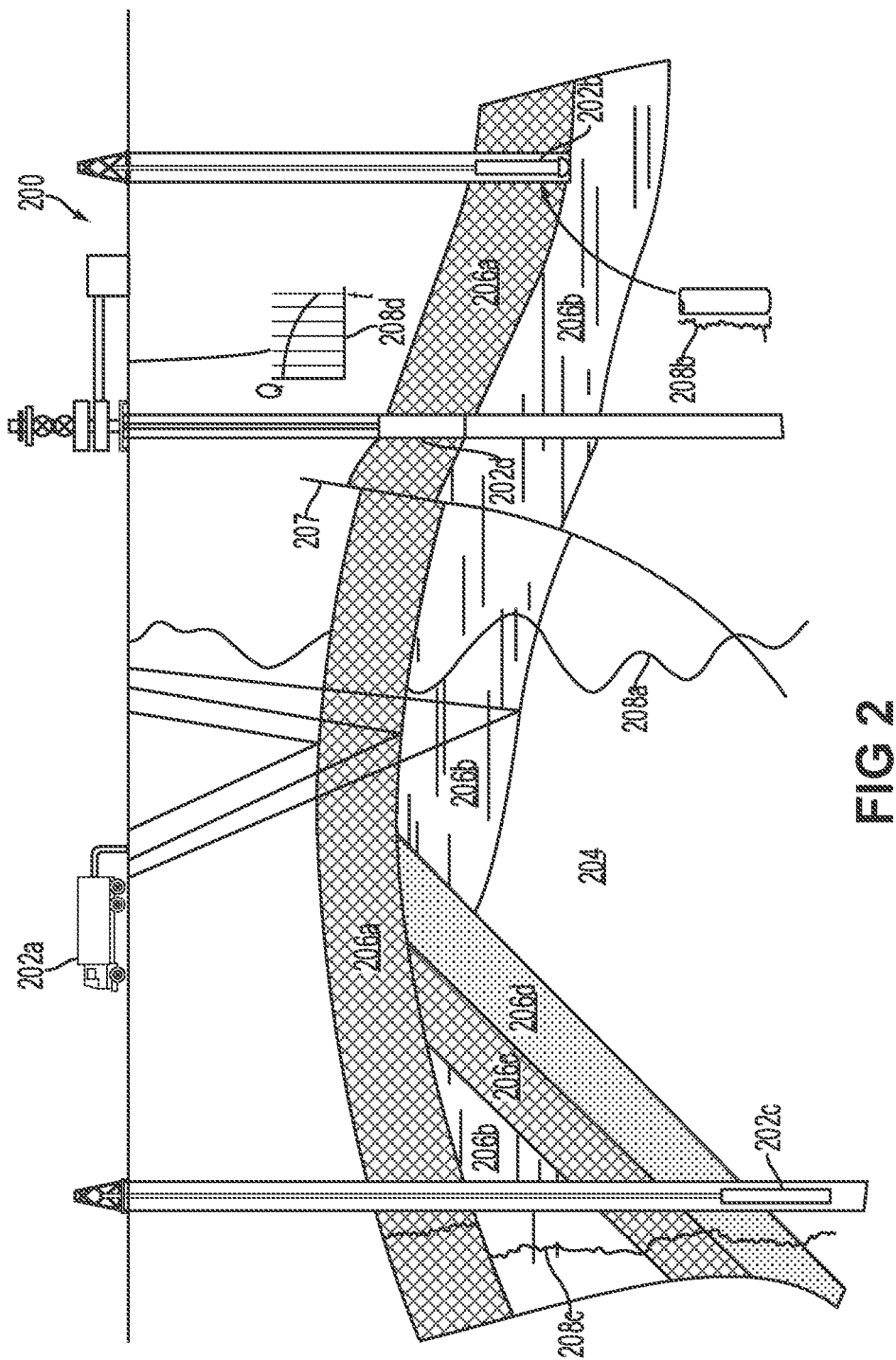

Aspects of the present disclosure may include a system and method for adding geotags to images that may be stored across various repositories. A geotag may be a marker, which may be associated with a spatial location in a subterranean domain, and may be employed to associate data related to the subterranean domain with various other data from potentially many different sources. In some embodiments, the images may be any variety of images, such as seismic images or geological images (e.g., source, reservoir), geophysical (e.g., gault shadow) images, QC-residual multiple images, etc. In some embodiments, the geotags may include geolocation information (e.g., XYZ coordinates), and information regarding image scenes saved by a user (e.g., date, user information, selection of data, filters, view, display settings, canvas, etc.). In some embodiments, the geotags may be manually generated and linked to an image. Additionally or alternatively, the geotags may be autogenerated by automatic attribute identification, machine learning, image-based classification, etc. In some embodiments, the XYZ coordinates may identify a location in a geological subsurface that may be independent (or mostly independent) of a dataset in which the coordinates are discovered. The location corresponding to the XYZ coordinates may be an area of interest or an area representing an opportunity for exploration. Each image may be saved with the manually and/or auto-generated geotags. As described herein, the geotagged images may be used to identify opportunities, analogues, leads and plays. For example, a user may search for images that have a certain set of geotags that correspond to a specific analogue for identifying leads and accelerating opportunity maturation along an opportunity pipeline having future opportunities, leads, prospects, drilling locations, and wells. In some embodiments, the systems described herein may also provide an interface for collaborating whereby collaborators may provide input for rankings/prioritization, tick sheet, comments, new geotags/markings, etc. These inputs may also be stored as geotags along with the images.

Reference will now be made in detail to embodiments, examples of which are illustrated in the accompanying drawings and figures. In the following detailed description, numerous specific details are set forth in order to provide a thorough understanding of the disclosure. However, it will be apparent to one of ordinary skill in the art that the disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the disclosure. The first object and the second object are both objects, respectively, but they are not to be considered the same object.

The terminology used in the description of the disclosure herein is for the purpose of describing particular embodiments only and is not intended to be limiting of the disclosure. As used in the description of the disclosure and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3A:
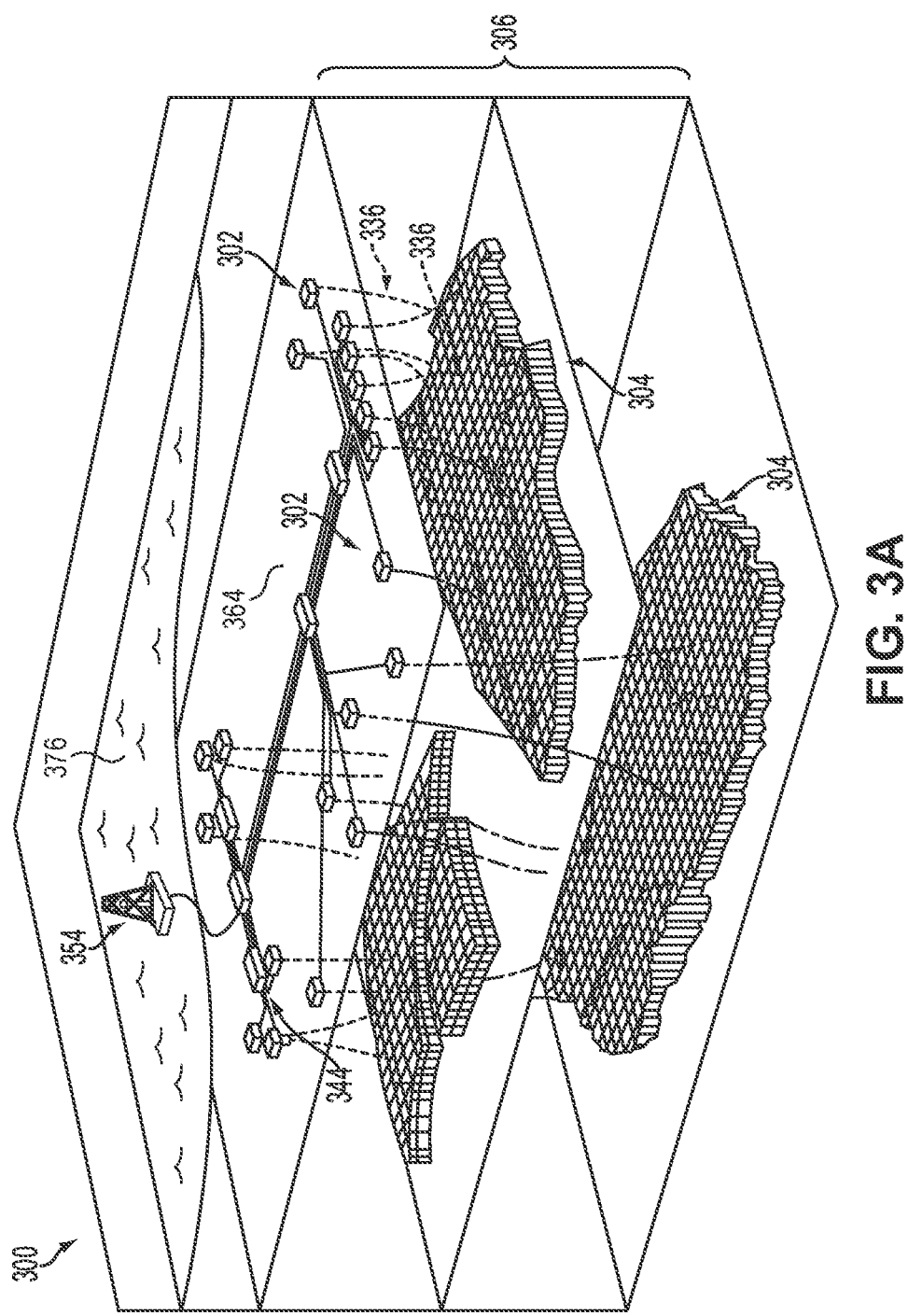

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present. In the illustrates, marine example, the environment may include a sea surface 376 and a seafloor surface 364.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
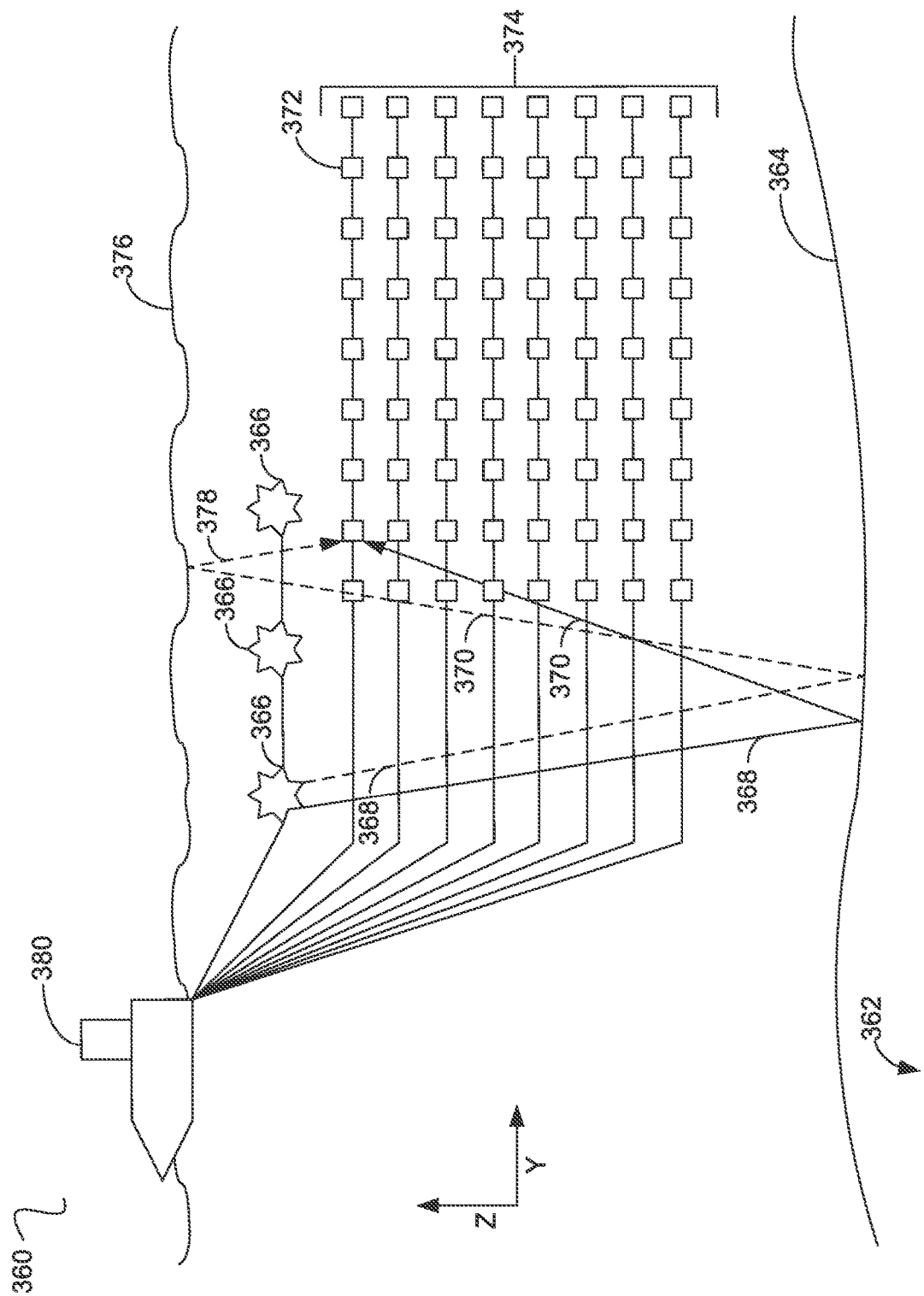

Attention is now directed to FIG. 3B, which illustrates a side view of a marine-based survey 360 of a subterranean subsurface 362 in accordance with one or more implementations of various techniques described herein. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the sea surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Figure 4A:
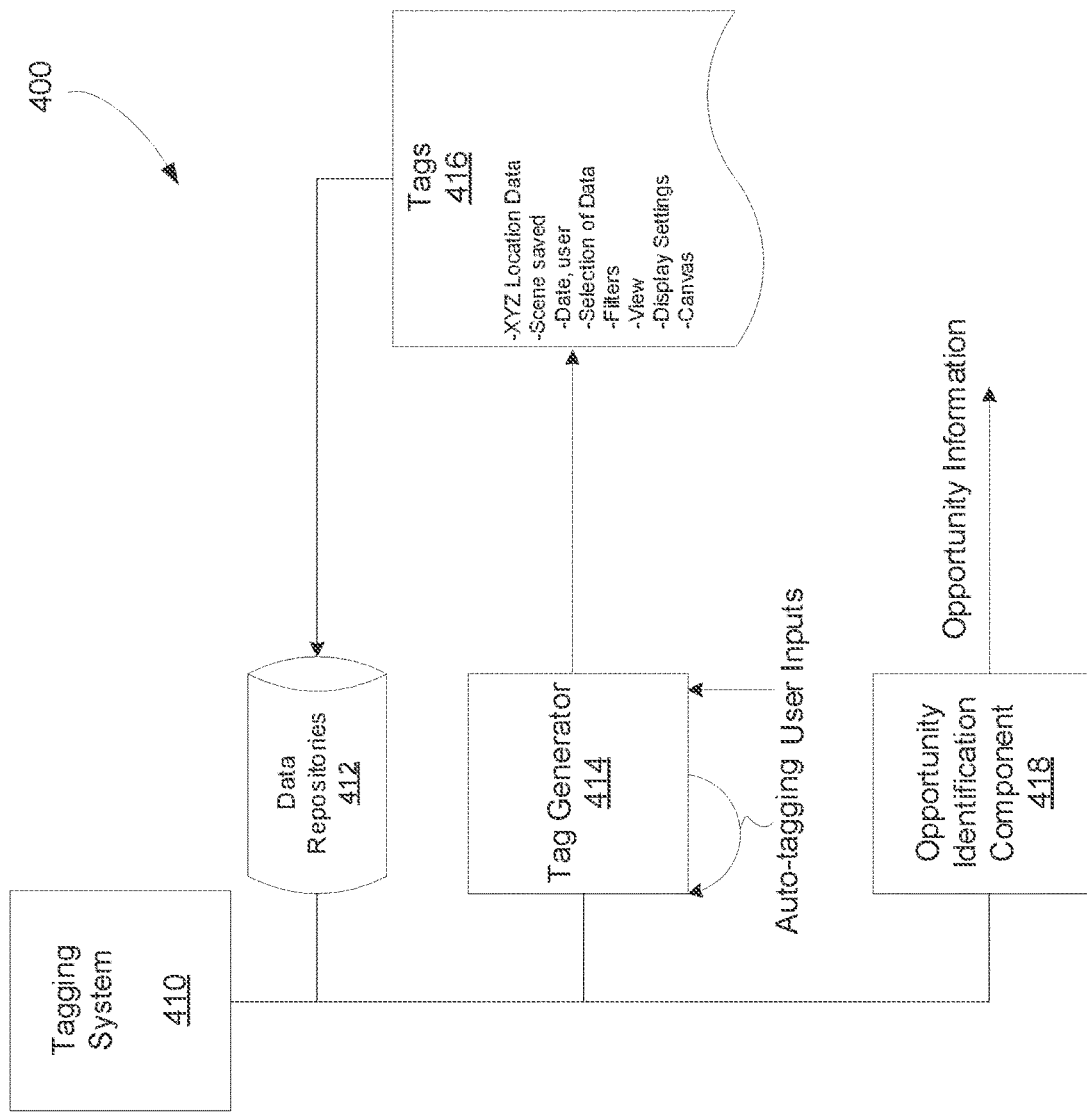
FIG. 4A illustrates example components and functions of an image geotagging system.

FIG. 4A illustrates a block diagram of a geotagging system 400, according to an embodiment. The system 400 may include one or more data repositories 412, a geotag generator 414, and a geotag 416. The data repositories 412 may include databases that store oil and gas exploration related images (e.g., seismic data images, geological images, geophysical images, etc.) or other data. The geotag generator 414 may access data from the repository 412 and apply geotags 416 to portions of the data, e.g., in association with a location in a subterranean domain.

The geotags 416 may include geolocation information (e.g., XYZ coordinates), and information regarding data, such as image scenes, saved by a user (e.g., date, user information, selection of data, filters, view, display settings, canvas, etc.). In some embodiments, the XYZ coordinates may identify a location in a geological subsurface that may be independent of a dataset in which the coordinates are discovered. The geotags 416 may represent features/attributes within an image or other data representing (e.g., spatially representing) the subterranean domain. In some embodiments, the geotag generator 414 may receive user inputs that identify attributes which are used to manually geotagging the images. The geotag generator 414 may also execute an auto-geotagging function to automatically identify image attributes and apply geotags to the images (e.g., by automatic attribute identification, machine learning, image-based classification, etc.).

The geotags 416 may be stored in the repository 412, and more specifically, individual geotags 416 may be linked and associated with a respective image. The system 400 may also include an opportunity identification component 418 may identify and output information regarding opportunities (e.g., images having a set of geotags representing an analogue, lead, play, or opportunity for exploration). In some embodiments, the opportunity identification component 418 may identify an opportunity based on user input identifying the set of geotags. The opportunity identification component 418 may automatically identify a set of geotags that represent an opportunity (e.g., based on machine learning techniques, historical data that identifies different combinations of geotags that represent opportunities, etc.).

Figure 4B:
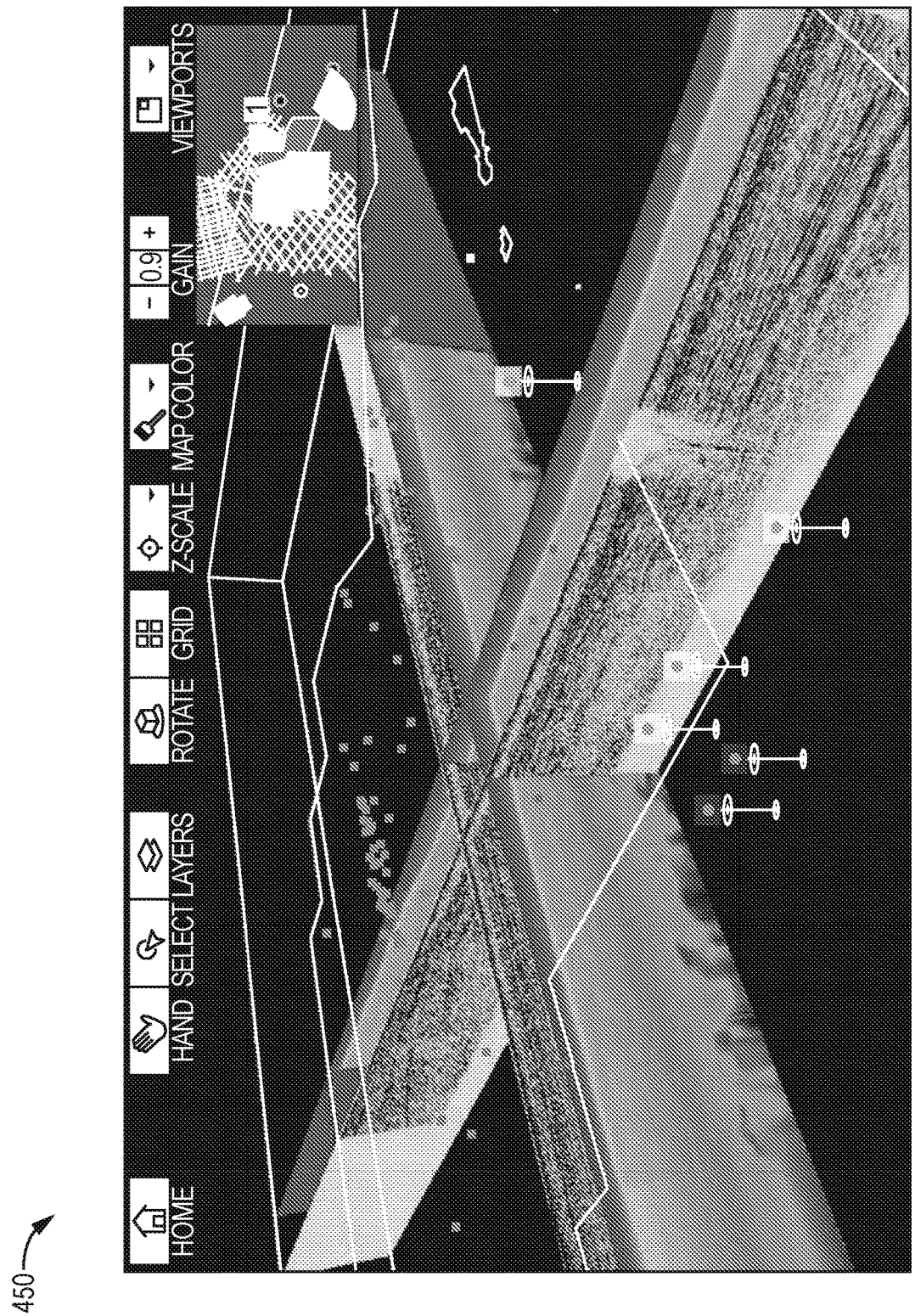
FIG. 4B illustrates an example interface for presenting an image with geotags and collaboration interface.

FIG. 4B illustrates an example interface 450 for presenting data (e.g., an image) with geotags and collaboration interface. As shown in FIG. 4B, an image is shown in which collaborators may provide comments regarding data and leads/opportunities. The collaborators comments and inputs may be stored and linked with the image and may be used to score or rank the quality of the lead, or its explorability. For example, a voting or rating system may be implemented, and/or natural language processing may be implemented to determine the sentiment of comments whereby the comment sentiment is used to rank the explorability rating an image.

Figure 4C:
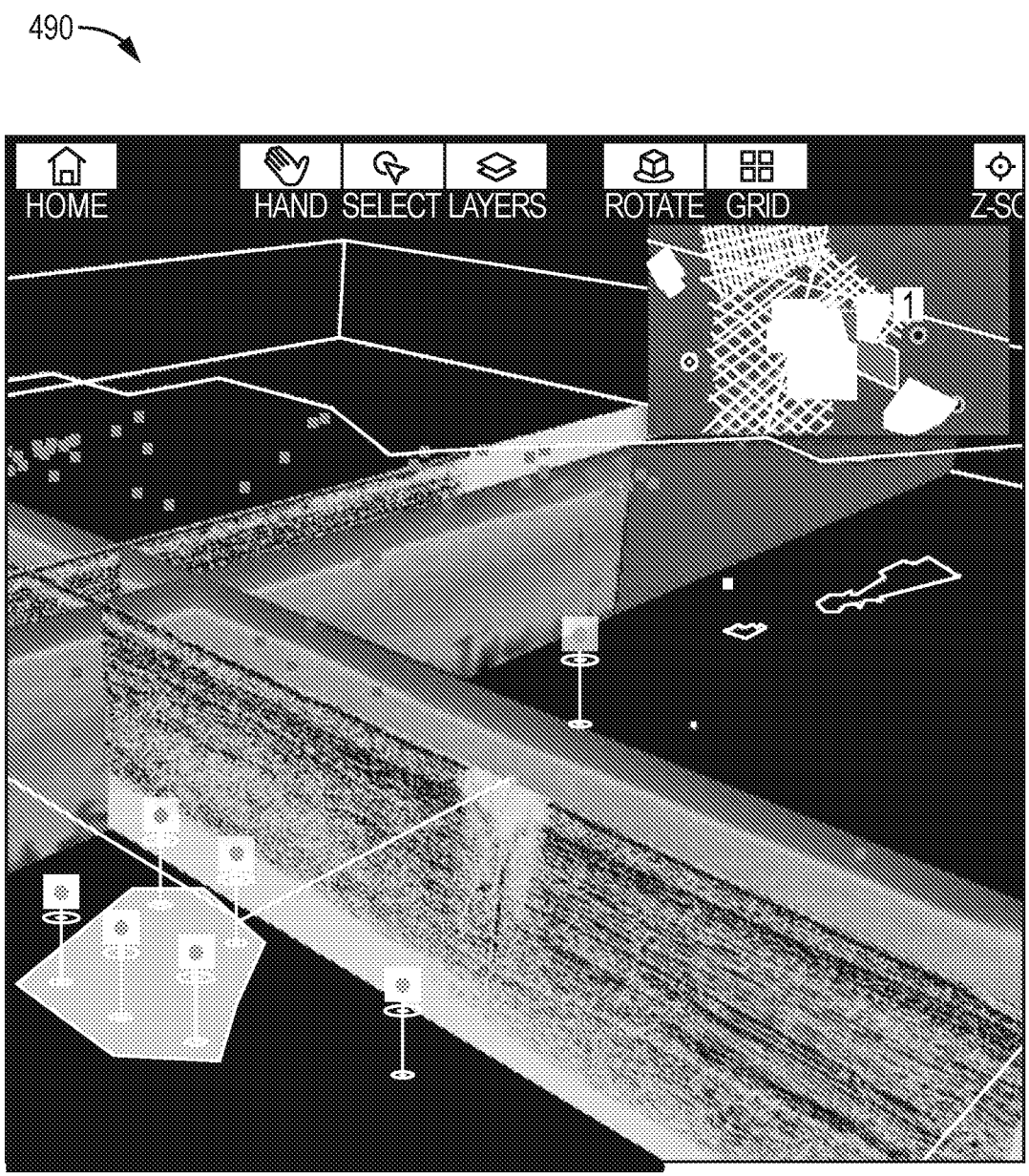
FIG. 4C illustrates an example of filtering an image based on requested geotags.

FIG. 4C illustrates an example interface 490 for filtering an image based on requested geotags. In some embodiments, certain geotags may be selected to filter the image based on those geotags for further analysis and opportunity identification. Example geotags that may be selected may include requested types of datasets, requested types of analysis tools, etc.

Figure 5:
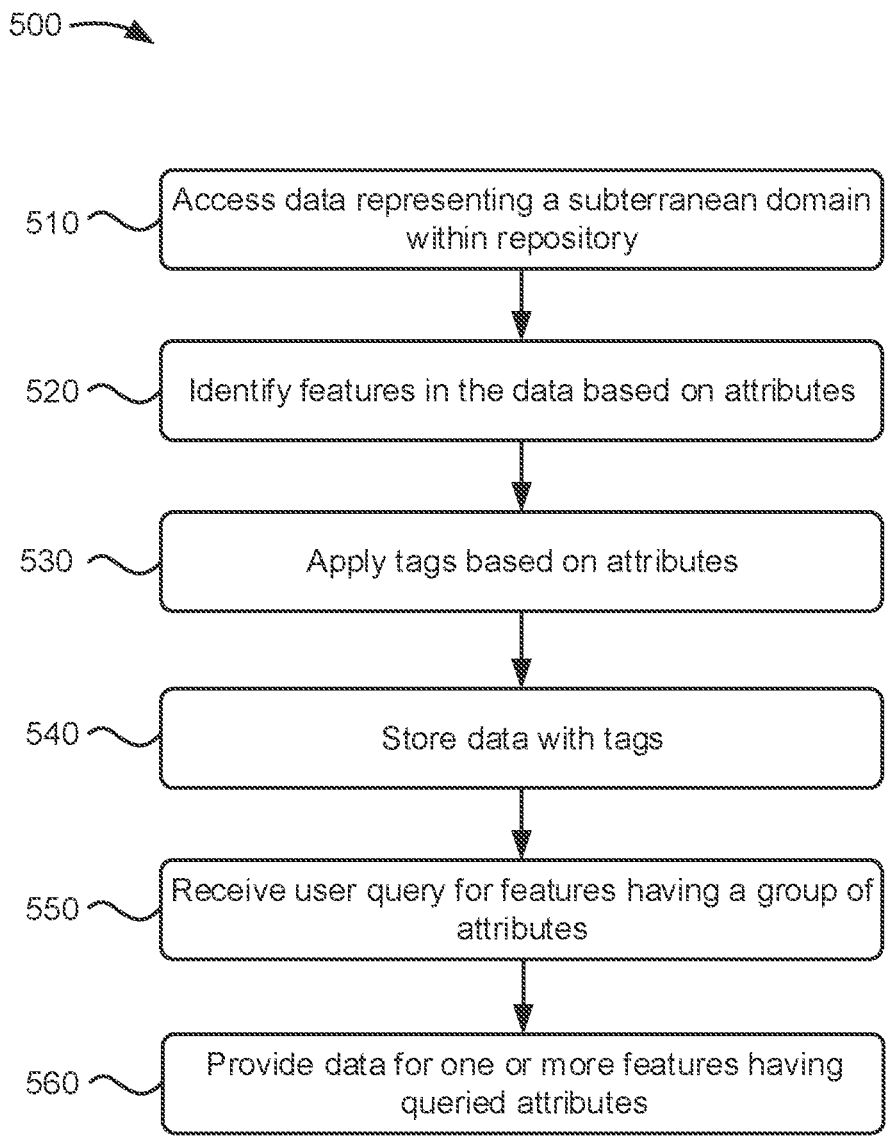
FIG. 5 illustrates a flowchart of a method for geotagging data to identify opportunities and analogues, according to an embodiment.

FIG. 5 illustrates a flowchart of a method 500 for geotagging data, e.g., to identify opportunities and analogues, according to an embodiment. The method 500 may include accessing data representing a subterranean domain within the repository 412, as at 510. The data accessed at 510 may be image-based data, such as seismic images, well log, core data, geological models, or other data within the repository 412. In particular, the data may be mapped to a geological location, e.g., in at least three dimensions (e.g., via cartesian coordinates). In some embodiments, the geotag generator 414 may automatically access the data as part of an automatic geotagging process. In an embodiment, the geotag generator 414 may receive an instruction to access the data via a user interface.

The method 500 may further include identifying features in the data based on attributes thereof data attributes, e.g., features present in the data, as at 520. As the terms are used herein, "feature" refers to a characteristic of the data that is considered worth capturing by geotags, and an "attribute" is a characteristic of the data that becomes accessible through creation of a derivative of the data, for example, a seismic attribute. For example, data may be modified, processed, etc. to reveal attributes, which may then be employed to identify features in the data that were not recognizable prior to generating the attribute data. In other examples, the features may be detected directly from the unprocessed or "raw" data, e.g. without generating an attribute first. For example, the geotag generator 414 may receive user inputs that identify the attributes. Additionally, the repository 412 may implement machine learning, image-based classification, automatic feature identification, and/or other techniques to identify the image attributes. In some embodiments, the attributes may include geological objects, geological or seismic attributes, geolocation information (e.g., XYZ coordinates), and information regarding (e.g., image) scenes saved by a user (e.g., date, user information, selection of data, filters, view, display settings, canvas, etc.). In some embodiments, the XYZ coordinates may identify a location in a geological subsurface that may be independent of a dataset in which the coordinates are discovered.

The method 500 may also include applying geotags to the data based on the attributes, as at 530. For example, the geotag generator 414 may generate and apply the geotags to the data in which the geotags identify the features at a particular geolocation within the subterranean domain represented by the data. In another example, the geotag generator 414 may apply a single geotag identifying the features.

The method 500 may further include storing data in association with the geotags, as at 540. For example, the geotag generator 414 may store the data with the applied geotags in the repository 412.

The method 500 may also include receiving a user query for geotags or features having a group of attributes, as at 550. For example, the opportunity identification component 418 may receive a user query requesting geotags or features having a group of attributes that may represent an opportunity, a play, a lead, prospect, an analogue, etc. As an example, a query may identify a prospect having a set of particular reservoir characteristics.

The method 500 may further include providing geotags having one or more of the queried attributes, or attributes considered similar thereto, as at 560. For example, the opportunity identification component 418 may provide the data in response to the query. Additionally, the opportunity identification component 418 may identify an opportunity, a play, a league, an analogue, etc. automatically without receiving a user query (e.g., based on machine learning techniques, historical data that identifies different combinations of geotags that represent opportunities, etc.). In some embodiments, geotags may be grouped together by the opportunity identification component 418.

Figure 6:
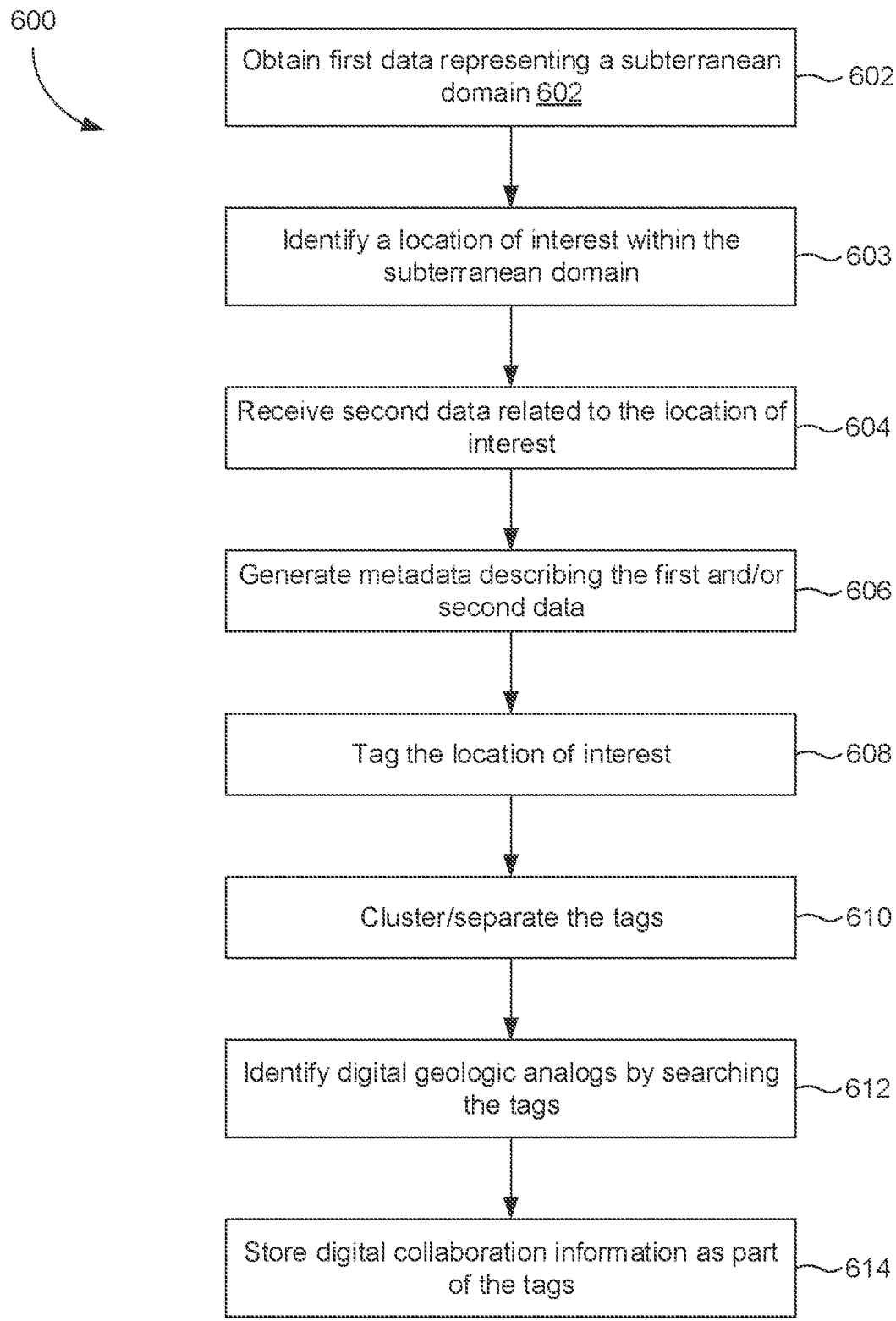
FIG. 6 illustrates a flowchart of another method for geotagging data and identifying analogues, according to an embodiment.

FIG. 6 illustrates a flowchart of a method 600 for organizing and processing data, e.g., applying geotags to data, according to an embodiment. The method 600 may, in an embodiment, be an implementation of an embodiment of the method 500 discussed above, and thus the methods 500, 600 should not be considered mutually exclusive.

The method 600 may include obtaining first data representing a subterranean domain, as at 602. For example, the first data may be image-based data representing a three-dimensional volume located in whole or in part beneath the Earth's surface. The volume represented may be relatively large in scope, e.g., a domain including one or more oilfields, a basin, or larger. In other embodiments, the volume may be relatively small, representing part of a reservoir, or one or more slices of the subterranean domain where a planned wellbore is to be formed. The data obtained at 602 may be mapped to the subterranean domain, such that different areas in the domain are represented by different portions of the data.

The method 600 may also include identifying a location of interest within the subterranean domain, as at 603. The location of interest may be identified automatically based on the first data, e.g., by a machine-learning algorithm trained to recognize subterranean geological features, such as salt domes, traps, faults, or other areas, e.g., conducive to hydrocarbon formation or otherwise relevant to well location, drilling, etc. In other embodiments, a human user (e.g., a subject-matter expert) may identify such features in the data. For example, features of interest in crossline and inline seismic images may be indicated as features of interest. In other cases, the location of interest may be identified in response to obtaining information (see block 604, discussed below) related to the location.

The method 600 may include receiving second data about the location of interest, as at 604. The second data may relate directly to the geology of the location, and thus may be considered "raw" data (although it may be subjected to various processing techniques). However, the second data received at 604 may be different from the first data in which the location of interest was identified at 603, e.g., it may be from a different source, which the geotags may serve to link together, based on location, as described herein. For example, the second data may be data collected from field tests or exploration operations. Specific examples of such second data may include seismic data, well logs, satellite images, gravity data, magnetic data, or maps. The second data may also relate to political conditions, or other factors that may impact the risk associated with drilling, producing, or otherwise operating in a particular region. For example, the data may include news articles. The second data may further include competitive intelligence, such as announcements, regulatory filings, or other information related to activity by business entities, particularly oilfield-related entities, in the area, which may, for example, pertain to the level of success experienced by other entities previously in an area.

Further, in one or more embodiments, as at 606, metadata (i.e., data describing the raw data) may be generated for the first data, the second data, or both. Such metadata may include the source of the data (e.g., author, date of creation, location, affiliation, etc.). Metadata may further include a data component, which may describe the manner in which the data was collected, e.g., interpretation settings, analysis window, etc. The metadata may further include an indication of a petroleum system component, which may provide information regarding the petroleum system elements identified at the location, such as source and maturation of hydrocarbons, migration pathway, reservoir, seal trap, retention, and play. The metadata may also include a geology component, which may provide present and geologically historic structure and stratigraphic settings, geologic age, sequence stratigraphic descriptions, and lithology. The metadata may further include information related to "risking" (e.g., determining a likelihood of success for a well or play), such as risking parameters, information about chance of success for a petroleum system element, etc. The metadata may also include a petroleum economics component, such as legislation, block/concession and ownership data, information regarding a field, its development status, infrastructure, and/or production. The metadata may also include a drilling component such as information regarding pressure, well planning and completion. Once the metadata is generated, or even while it is being generated, it may then be stored in association with the coordinates of the location of interest, e.g., along with the raw data.

The method 600 may include tagging the location of interest, as at 608. Tagging may proceed by creating a "geotag" for the location, where the geotag is associated with a particular three-dimensional (at least) location within the subterranean domain. In an embodiment, tagging the location may include forming an entry in a database, which stores the location's coordinates in at least three dimensions (e.g., latitude, longitude, and depth/geological age). The location may also be stored in at least one additional dimension, such as time. In addition, the database entry may include the first data obtained at 602, the second data received at 604, and/or the metadata generated at 606, which may thus be stored in connection or "association" with the coordinates of the location.

Accordingly, the geotag may generally not be static and embedded directly into the first data representing the subterranean domain. Rather, a coordinate specifying a location in the horizontal axes X and Y, as well as a vertical, depth axis Z (and potentially at a time T) may be associated with the geotag. This geotag may appear to a user when the view of the location of interest is within the user's field of view on a user's screen when viewing the first data, in response to the view including the coordinates of the location of interest. A symbol (e.g., a pin) may then be presented in the view, which the user may access to acquire additional information about the location, based on the data associated therewith in the geotag. As such, the geotag represents data that changes dynamically, rather than being embedded statically within the map. This is generally the simplest way in which the geotag may be employed, and other, more complex, and potentially more powerful uses for the geotags are also described below.

Figure 7:
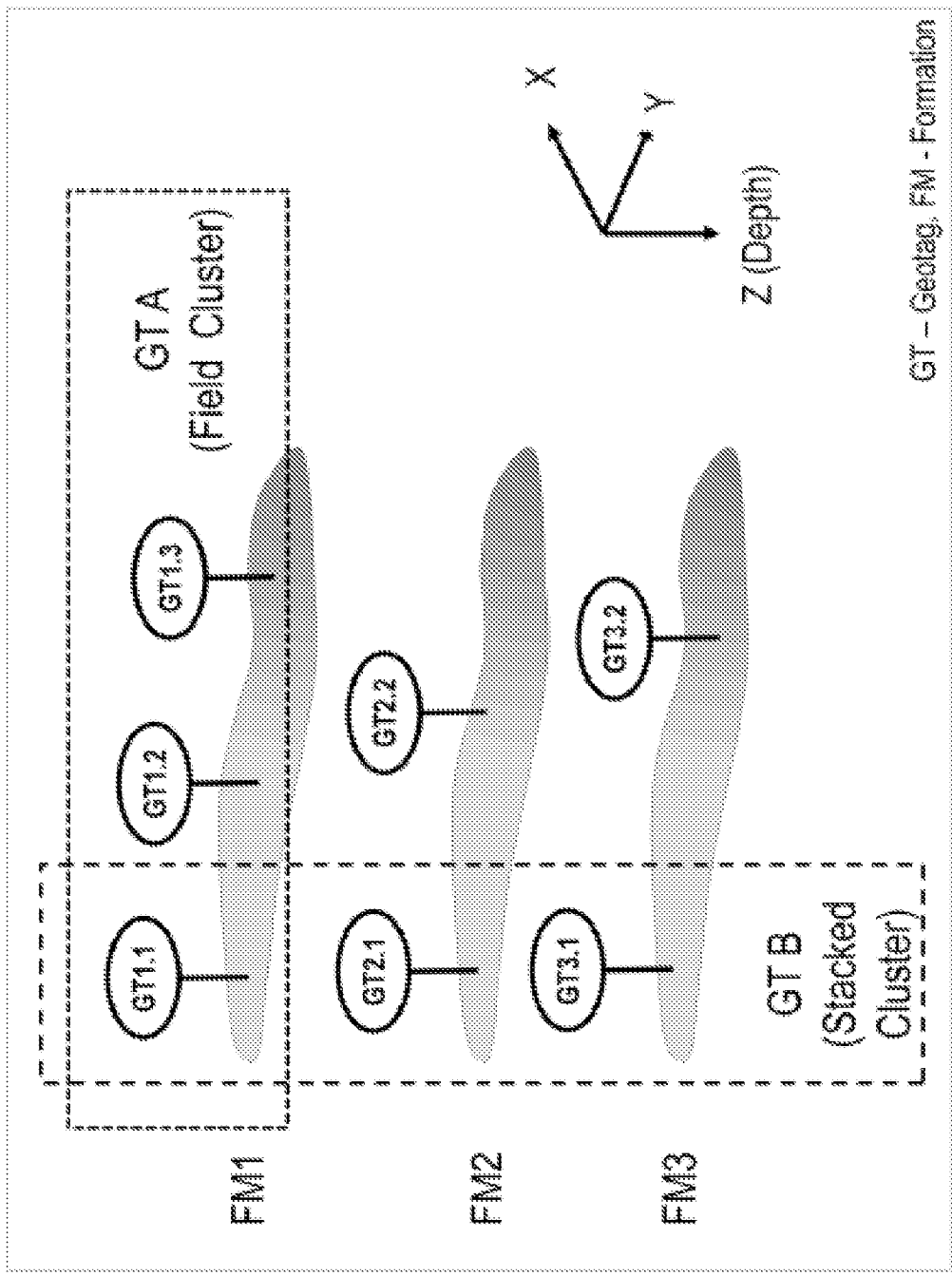
FIG. 7 illustrates a conceptual view of clustering and separating geotags, according to an embodiment.

In some embodiments, the geotags may be considered as a cluster of multiple geotags and then aggregated to form new geotags, as at 610. FIG. 7 illustrates an example of such clustering, separating, and aggregating, according to an embodiment. For example, a first geotag GT A may initially be formed as representing a field, which may be formed using regional data. The geotag GT A may be split into multiple geotags GT1.1, GT1.2, GT1.3, which may represent the same information, but with a higher degree of resolution, e.g., providing data related to more local, rather than regional, areas. This may occur upon further analysis or interest in a particular location, which mean lead to more information about the region, such that a higher degree of resolution in the horizontal plane is appropriate.

In another embodiment, a second geotag GT B may be formed from two or more geotags, e.g., GT1.1, GT2.1, GT3.1. The geotags GT1.1, GT2.1, GT3.1 may each identify a different formation FM1, FM2, FM3, as shown, at a different depth, and may be generally aligned horizontally. For example, to facilitate risking analysis, the second geotag GT B may be formed by clustering these geotags GT1.1, GT2.1, GT3.1 together. Generally, wells are not drilled on one single reservoir level because of too high risk. Therefore, several leads stacked on top of each other may be provided so that a single well may penetrate multiple lead areas with the chance of success being the sum of the chances of success for each reservoir level, and thus increased. The vertical clustering of geotags may thus condense the analysis of several vertically-offset reservoirs by representing two or more levels as a single tag. As will be appreciated, this is generally not accomplished with a two-dimensional projection to the surface, as the offset nature of the geotags is lost in such a projection.

Figure 8:
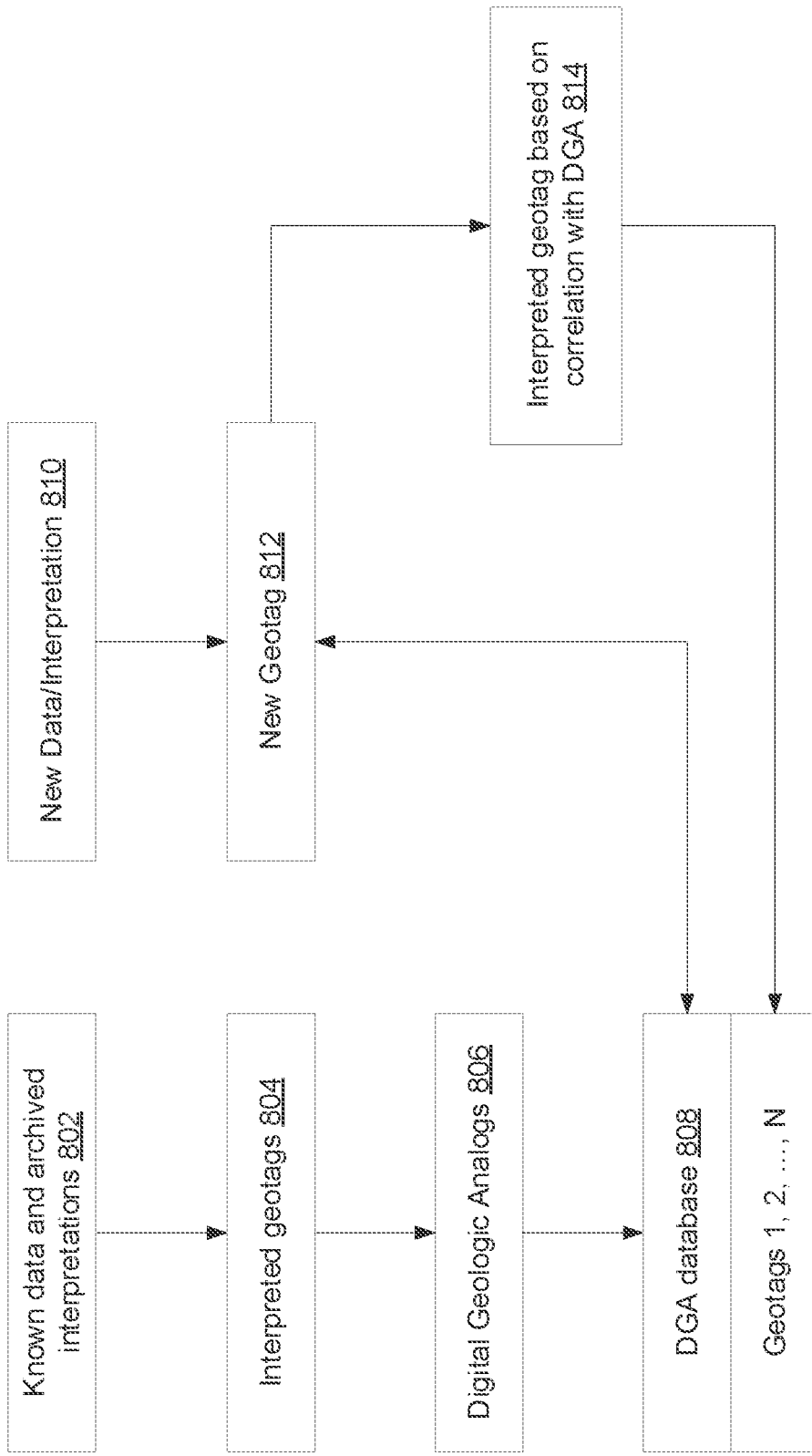
FIG. 8 illustrates a block diagram of a process for identifying digital geologic analogs and interpreting data based thereon, according to an embodiment.

The method 600 may also include identifying digital geologic analogs (DGAs) to the geotag of the location of interest by searching previously-stored geotags, as at 612. FIG. 8 illustrates a block diagram illustrating the use of geotags to identify geologic analogs in a database. As described above, data with archived interpretation geotags may be stored in a database, as at block 802.

In an embodiment, a database of DGAs may be built. For example, known data and archived interpretations at 802 may be interpreted into geotags at 804. This may include recording metadata and/or conducting other processes on the raw data associated with the locations represented by the individual geotags. The resulting interpreted geotag may be a potential DGA, as at 806. The interpreted geotags may then be stored in the database (e.g., in a cloud environment). A library of DGA geotags, as at 808, may be made available for searching when using new data.

When interpreting new data at 810, new geotags may be created, as at 812. The metadata of the new geotags may be entered into a digital search of the DGA data to identify similarities of new geotags with geotags in the database 808. Once the similar geotags are identified, e.g., based on similar geology, similar equipment, similar location, or other comparative data indicating that the information about one geotag is relevant to another geotag, the geotags identified in the search may be used for interpreting the new geotag as at 814. Upon completion of the interpretation, the new geotag is then entered into the DGA database 808, thus enhancing and refining the contents of the database.

In some embodiments, artificial intelligence may be employed to identify the DGAs. For example, a supervised machine-learning algorithm may be trained, e.g., based on a human user identifying analogs to a training set of geotags. In other embodiments, other types of artificial intelligence may be employed.

Further, as mentioned above, the metadata may include information related to "risking", e.g., determining a likelihood of success for drilling in a location, production from a particular reservoir or in a particular country, etc. Accordingly, the method 600 may, in some embodiments, include determining that the risking analysis is insufficient for newly-created geotag created at 812. The method 600 may thus include searching the DGA database 808 for DGAs for which the risking analysis is reasonably complete, e.g., within a threshold level of uncertainty. The method 600 may then employ the risking analysis from the DGA to inform the risking analysis for the new geotag.

Referring again to FIG. 6, the method 600 may further include storing digital collaboration information in association with location information, e.g., as part of the geotag or entry in the database, as at 614. For example, structured or unstructured text data may be entered by a first human user into one or more data fields and stored in the database in association with the location of interest. Additional such data may be stored in one or more additional data fields associated with the location of interest by another human user, e.g., another member of a team or organization including the first user. This may facilitate the second user building upon the knowledge recorded by the first user and providing additional information for subsequent use by others. This additional data may include metadata explanations, thus refining the interpretation and making the metadata more transparent for management decisions.

Aspects of the present disclosure may provide a system and/or method for geotagging images stored across a variety of different databases and storage devices. In some embodiments, aspects of the present disclosure may provide a technique for improving knowledge management (e.g., organization of ideas, progressing thinking) by providing an interface whereby contributor comments, ratings, and feedback may be stored, saved, and linked with associated images. Further aspects of the present disclosure may provide improvements in collaboration by providing an interface whereby ideas regarding images may be shared, saved, and linked with images, thus building knowledge, retaining knowledge, and democratizing knowledge.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 9:
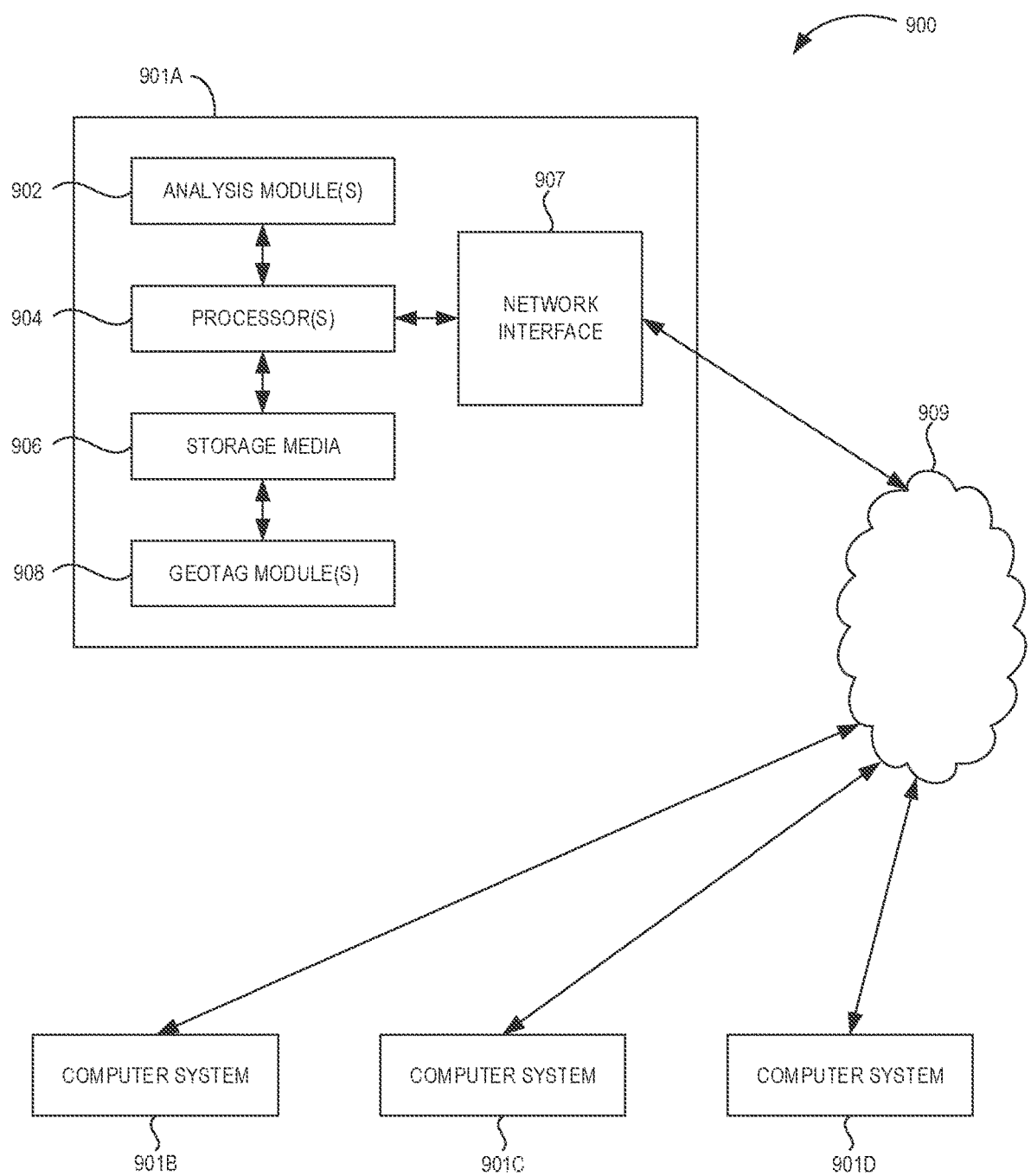
FIG. 9 illustrates a schematic view of a computing system, according to an embodiment.

In some embodiments, any of the methods of the present disclosure may be executed by a computing system. FIG. 9 illustrates an example of such a computing system 900, in accordance with some embodiments. The computing system 900 may include a computer or computer system 901A, which may be an individual computer system 901A or an arrangement of distributed computer systems. The computer system 901A includes one or more analysis module(s) 902 configured to perform various tasks according to some embodiments, such as one or more methods disclosed herein. To perform these various tasks, the analysis module 902 executes independently, or in coordination with, one or more processors 904, which is (or are) connected to one or more storage media 906. The processor(s) 904 is (or are) also connected to a network interface 907 to allow the computer system 901A to communicate over a data network 909 with one or more additional computer systems and/or computing systems, such as 901B, 901C, and/or 901D (note that computer systems 901B, 901C and/or 901D may or may not share the same architecture as computer system 901A, and may be located in different physical locations, e.g., computer systems 901A and 901B may be located in a processing facility, while in communication with one or more computer systems such as 901C and/or 901D that are located in one or more data centers, and/or located in varying countries on different continents).

A processor can include a microprocessor, microcontroller, processor module or subsystem, programmable integrated circuit, programmable gate array, or another control or computing device.

The storage media 906 can be implemented as one or more computer-readable or machine-readable storage media. Note that while in the example embodiment of FIG. 9 storage media 906 is depicted as within computer system 901A, in some embodiments, storage media 906 may be distributed within and/or across multiple internal and/or external enclosures of computing system 901A and/or additional computing systems. Storage media 906 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 900 contains one or more geotag module(s) 908. In the example of computing system 900, computer system 901A includes the geotag module 908. In some embodiments, a geotag module 908 may be used to perform some or all aspects of one or more embodiments of the methods. In alternate embodiments, a plurality of geotag modules 908 may be used to perform some or all aspects of methods.

It should be appreciated that computing system 900 is only one example of a computing system, and that computing system 900 may have more or fewer components than shown, may combine additional components not depicted in the example embodiment of FIG. 9, and/or computing system 900 may have a different configuration or arrangement of the components depicted in FIG. 9. The various components shown in FIG. 9 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the disclosure.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 900, FIG. 9), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

What is claimed is:

1. A method, comprising:
obtaining first data representing a subterranean domain, wherein the first data represents any, or a portion, of: an oilfield, a basin, a reservoir, a planned wellbore;
creating a geotag associated with a three-dimensional location of interest in the subterranean domain and a feature at the location of interest, wherein the geotag is further associated with second data that describes the location of interest in the subterranean domain;
associating the geotag with at least one additional geotag, wherein the at least one additional geotag is associated with at least one additional location of interest in the subterranean domain or provides an additional degree of resolution for the feature;
generating metadata describing a portion of the first data, the second data, or both; and
storing the geotag in a database comprising a plurality of geotags, wherein the metadata is stored in association with the geotag.

2. The method of claim 1, further comprising searching for an analog to the geotag, wherein searching comprises:
accessing the database;
identifying one or more analogs to the feature indicated by the geotag based on a comparison of the metadata associated with the geotag to metadata associated with the plurality of geotags or a comparison of the first data, the second data, or both describing the location of interest with data describing other locations associated with the plurality of geotags; and
associating the one or more analogs with the geotag in the database.

3. The method of claim 2, further comprising training an artificial intelligence to identify the one or more analogs, wherein searching for the analog comprises the artificial intelligence searching in the database to find a geotag associated with an analog.

4. The method of claim 1, wherein the second data comprises at least one of a seismic image, a well log, a satellite image, gravity data, a map, or a text-based news article.

5. The method of claim 1, wherein the second data is dynamic, such that the second data associated with the location of interest and the geotag is also dynamic.

6. The method of claim 1, wherein generating the metadata comprises receiving knowledge data from a user that provides an interpretation of the first data, the second data, or both.

7. The method of claim 1, wherein the three-dimensional location comprises two coordinates in a horizontal plane and one coordinate in a vertical plane representing a depth of the location, a geological age of the location, or both.

8. The method of claim 1, further comprising:
determining that the first data, the second data, and the metadata is insufficient for determining a likelihood of success for an operation including the location of interest; and
searching for a geotag in the database associated with a location for which a likelihood of success has been determined.

9. The method of claim 1, further comprising:
clustering the geotag into a plurality of geotags representing different locations; and
grouping at least one of the plurality of geotags with another geotag representing another location.

10. A computing system, comprising:
one or more processors; and
a memory system comprising one or more non-transitory computer-readable media storing instructions that, when executed by at least one of the one or more processors, cause the computing system to perform operations, the operations comprising:
obtaining first data representing a subterranean domain, wherein the first data represents any, or a portion, of: an oilfield, a basin, a reservoir, a planned wellbore;
creating a geotag associated with a three-dimensional location of interest in the subterranean domain and a feature at the location of interest, wherein the geotag is further associated with second data that describes the location of interest in the subterranean domain;
associating the geotag with at least one additional geotag, wherein the at least one additional geotag is associated with at least one additional location of interest in the subterranean domain or provides an additional degree of resolution for the feature;
generating metadata describing a portion of the first data, the second data, or both;
storing the geotag in a database comprising a plurality of geotags, wherein the metadata is stored in the database in association with the geotag; and
searching for an analog to the geotag, wherein searching comprises:
accessing the database;
identifying one or more analogs to the feature indicated by the geotag based on a comparison of the metadata associated with the geotag to metadata associated with the plurality of geotags or a comparison of the first data, the second data, or both describing the location of interest with data describing other locations associated with the plurality of geotags; and
associating the one or more analogs with the geotag in the database.

11. The system of claim 10, wherein the second data comprises at least one of a seismic image, a well log, a satellite image, gravity data, a map, or a text-based news article.

12. The system of claim 10, wherein the second data is dynamic, such that the second data associated with the location of interest and the geotag is also dynamic.

13. The system of claim 10, wherein generating the metadata comprises receiving knowledge data from a user that provides an interpretation of the first data, the second data, or both.

14. The system of claim 10, wherein the three-dimensional location comprises two coordinates in a horizontal plane and one coordinate in a vertical plane representing a depth of the location, a geological age of the location, or both.

15. The system of claim 10, wherein the operations further comprise:
   determining that the first data, the second data, and the metadata is insufficient for determining a likelihood of success for an operation including the location of interest; and
   searching for a geotag in the database associated with a location for which a likelihood of success has been determined.

16. The system of claim 10, wherein the operations further comprise training an artificial intelligence to identify the one or more analogs, wherein searching for the analog comprises the artificial intelligence searching in the database to find a geotag associated with an analog.

17. The system of claim 10, further comprising:
   clustering the geotag into a plurality of geotags representing different locations; and
   grouping at least one of the plurality of geotags with another geotag representing another location.

18. A non-transitory computer-readable medium storing instructions that, when executed by at least one processor of a computing system, cause the computing system to perform operations, the operations comprising:
   obtaining first data representing a subterranean domain, wherein the first data represents any, or a portion, of: an oilfield, a basin, a reservoir, a planned wellbore;
   creating a geotag associated with a three-dimensional location of interest in the subterranean domain and a feature at the location of interest, wherein the geotag is further associated with second data that describes the location of interest in the subterranean domain;
   associating the geotag with at least one additional geotag, wherein the at least one additional geotag is associated with at least one additional location of interest in the subterranean domain or provides an additional degree of resolution for the feature;
   generating metadata describing a portion of the first data, the second data, or both;
   storing the geotag in a database comprising a plurality of geotags, wherein the metadata is stored in association with the geotag in the database; and
   searching for an analog to the geotag, wherein searching comprises:
      accessing the database;
      identifying one or more analogs to the feature indicated by the geotag based on a comparison of the metadata associated with the geotag to metadata associated with the plurality of geotags or a comparison of the data describing the location of interest with data describing other locations associated with the plurality of geotags; and
      associating the one or more analogs with the geotag in the database,
   wherein the second data comprises at least one of a seismic image, a well log, a satellite image, gravity data, a map, or a text-based news article, and wherein the second data is dynamic, such that the second data associated with the location of interest and the geotag is also dynamic.

19. The medium of claim 18, wherein the three-dimensional location comprises two coordinates in a horizontal plane and one coordinate in a vertical plane representing a depth of the location, a geological age of the location, or both.

20. The medium of claim 18, further comprising:
   clustering the geotag into a plurality of geotags representing different locations; and
   grouping at least one of the plurality of geotags with another geotag representing another location.

* * * * *